United States Patent
O'Brien et al.

(10) Patent No.: US 8,832,163 B1
(45) Date of Patent: Sep. 9, 2014

(54) TECHNIQUES FOR DETERMINING LOGICAL DATA OBJECTS CORRESPONDING TO PHYSICAL STORAGE LOCATIONS

(75) Inventors: Neil J. O'Brien, Groton, MA (US); Terry Seto Lee, Arcadia, CA (US); Mei Ren, Duluth, GA (US); Yiwen Huang, Wayland, MA (US); Narasimha Mandyam Krishnakumar, Natick, MA (US); Philip E. Tamer, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1772 days.

(21) Appl. No.: 11/901,213

(22) Filed: Sep. 14, 2007

(51) Int. Cl.
*G06F 17/30* (2006.01)
*G06F 12/00* (2006.01)

(52) U.S. Cl.
USPC .......................................... 707/831; 707/655

(58) Field of Classification Search
USPC ................. 707/1–10, 655, 831; 711/100–120
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,852,715 A | 12/1998 | Raz et al. | |
| 5,857,208 A | 1/1999 | Ofek | |
| 5,943,689 A | 8/1999 | Tamer | |
| 6,035,412 A | 3/2000 | Tamer et al. | |
| 6,282,602 B1 | 8/2001 | Blumenau et al. | |
| 6,329,985 B1 | 12/2001 | Tamer et al. | |
| 6,385,626 B1 | 5/2002 | Tamer et al. | |
| 6,393,540 B1 | 5/2002 | Blumenau et al. | |
| 6,542,909 B1 | 4/2003 | Tamer et al. | |
| 6,564,219 B1 | 5/2003 | Lee et al. | |
| 6,574,703 B1 | 6/2003 | Don et al. | |
| 6,842,810 B1 | 1/2005 | Fitzgerald et al. | |
| 6,883,063 B2 | 4/2005 | Blumenau et al. | |
| 6,938,059 B2 | 8/2005 | Tamer et al. | |
| 6,983,353 B2 | 1/2006 | Tamer et al. | |
| 6,993,530 B2 | 1/2006 | Lee et al. | |
| 7,127,556 B2 | 10/2006 | Blumenau et al. | |
| 2003/0130986 A1* | 7/2003 | Tamer et al. | 707/1 |
| 2003/0149683 A1* | 8/2003 | Lee et al. | 707/1 |
| 2005/0044312 A1* | 2/2005 | Blumenau et al. | 711/113 |

* cited by examiner

*Primary Examiner* — Hosain Alam
*Assistant Examiner* — Navneet K Ahluwalia
(74) *Attorney, Agent, or Firm* — Muirhead and Saturnelli, LLC

(57) ABSTRACT

Described are techniques for determining one or more logical data objects for a storage location. The storage location indicating a location on a device of a data storage system is provided. A list of one or more logical data objects is received. For each of the one or more logical data objects, one or more related data storage system locations associated with each logical data object are determined. It is determined whether the storage location is included in any of the one or more logical data objects. It is also identified whether, for each of the one or more logical data objects, the storage location is one of the one or more related data storage system locations associated with each logical data object.

20 Claims, 13 Drawing Sheets

TECHNIQUES FOR DETERMINING LOGICAL DATA OBJECTS CORRESPONDING TO PHYSICAL STORAGE LOCATIONS

BACKGROUND

1. Technical Field

This application generally relates to data storage, and more particularly to techniques used in connection with logical data objects and corresponding physical storage locations.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A host may utilize logical data objects to represent one or more locations of a data storage system. Logical data objects may correspond, for example, to files or other entities as referenced and used on the host. Each logical data object may be mapped to one or more related storage locations of the data storage system. Different techniques may be used in connection with logical data objects used by a host system. One technique provides for determining the corresponding physical storage locations for a given logical data object. For example, a file may be specified and the disk and disk locations associated with the file may be determined.

It may be desirable to perform a mapping process which can be characterized as the reverse of the foregoing. In such a mapping process, one or more storage locations may be specified and one or more corresponding host-side logical data objects determined.

SUMMARY OF THE INVENTION

In accordance with one aspect of the invention is a method for determining one or more logical data objects for a storage location comprising: providing the storage location indicating a location on a device of a data storage system; receiving a list of one or more logical data objects; determining, for each of the one or more logical data objects, one or more related data storage system locations associated with said each logical data object; and determining whether the storage location is included in any of the one or more logical data objects, said determining identifying whether, for each of the one or more logical data objects, the storage location is one of the one or more related data storage system locations associated with said each logical data object. The one or more logical data objects may be used by a host connected to the data storage system when performing I/O operations. One of the logical data objects may be a file system of the host. One of the logical data objects may be a file in the file system. One of the logical data objects may be one of a logical volume or a host device. The storage location may be specified using a first identifier for the device, and a second identifier representing one or more blocks on the device. The storage location may be specified using a third identifier for the data storage system. The storage location may identify a block on the device including corrupted data. The storage location may identify a block on the device being monitored to detect when the block has been modified.

In accordance with another aspect of the invention is a method for determining one or more logical data objects for a storage location comprising: providing the storage location indicating a location on a device of a data storage system; receiving a list of one or more file systems on a host, each of the one or more file systems being one of the logical data objects; determining, for each of the one or more file systems, one or more related data storage system locations associated with said each file system; and determining whether the storage location is included in any of the one or more file systems, said determining identifying whether, for each of the one or more file systems, the storage location is one of the one or more related data storage system locations associated with said each file system. The method may also include: identifying a first file system of said one or more file systems including the storage location; and determining a list of one or more files included in the first file system. The method may also include determining, for each of the one or more files in the list, one or more related data storage system locations associated with said each file. The method may also include determining whether the storage location is included in any of the one or more files of the first file system, said determining identifying whether, for each of the one or more files of the first file system, the storage location is one of the one or more related data storage system locations associated with said each file. If the storage location is not included in any of the files of the first file system, it may be determined that the storage location is included in either metadata or free space of the first file system, and otherwise determining that the storage location is included in user data of the first file system. The method may also include identifying a first file system of said one or more file systems including the storage location; and mapping the storage location to a logical representation of the storage location as used by the host. The method may include determining, using the logical representation of the storage location, whether the storage location is included in metadata of the first file system. If it is determined that the storage location is not included in the metadata of the first file system, the method may further comprise determining, using the logical representation of the storage location, whether the storage location is included in a file of the first file system, and wherein if the file is not included in a file of the first file system, the storage location is determined as being included in a free space portion of the first file system.

In accordance with another aspect of the invention is a system comprising: one or more data storage systems, each of the one or more data storage systems including one or more data storage devices; a host connected to the one or more data storage systems, the host including executable code stored on a computer readable medium for determining one or more logical data objects for a storage location on a device of one of the data storage systems, the computer readable medium comprising executable code for: providing the storage location indicating a location on a data storage device of one of the data storage systems; providing at least one mapping layer on the host connected to the data storage system, said at least one mapping layer including information used by the host to map logical data objects to corresponding storage locations in the data storage systems; and using the information to determine whether any of the logical data objects includes the storage location. The computer readable medium of the host may further comprise executable code for: receiving a list of the one or more logical data objects; determining, for each of the one or more logical data objects, one or more related data storage system locations associated with said each logical data object; and determining whether the storage location is included in any of the one or more logical data objects, said determining identifying whether, for each of the one or more logical data objects, the storage location is one of the one or more related data storage system locations associated with said each logical data object. The one or more logical data objects may include at least one of: a file system, a file, a logical volume, and a logical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
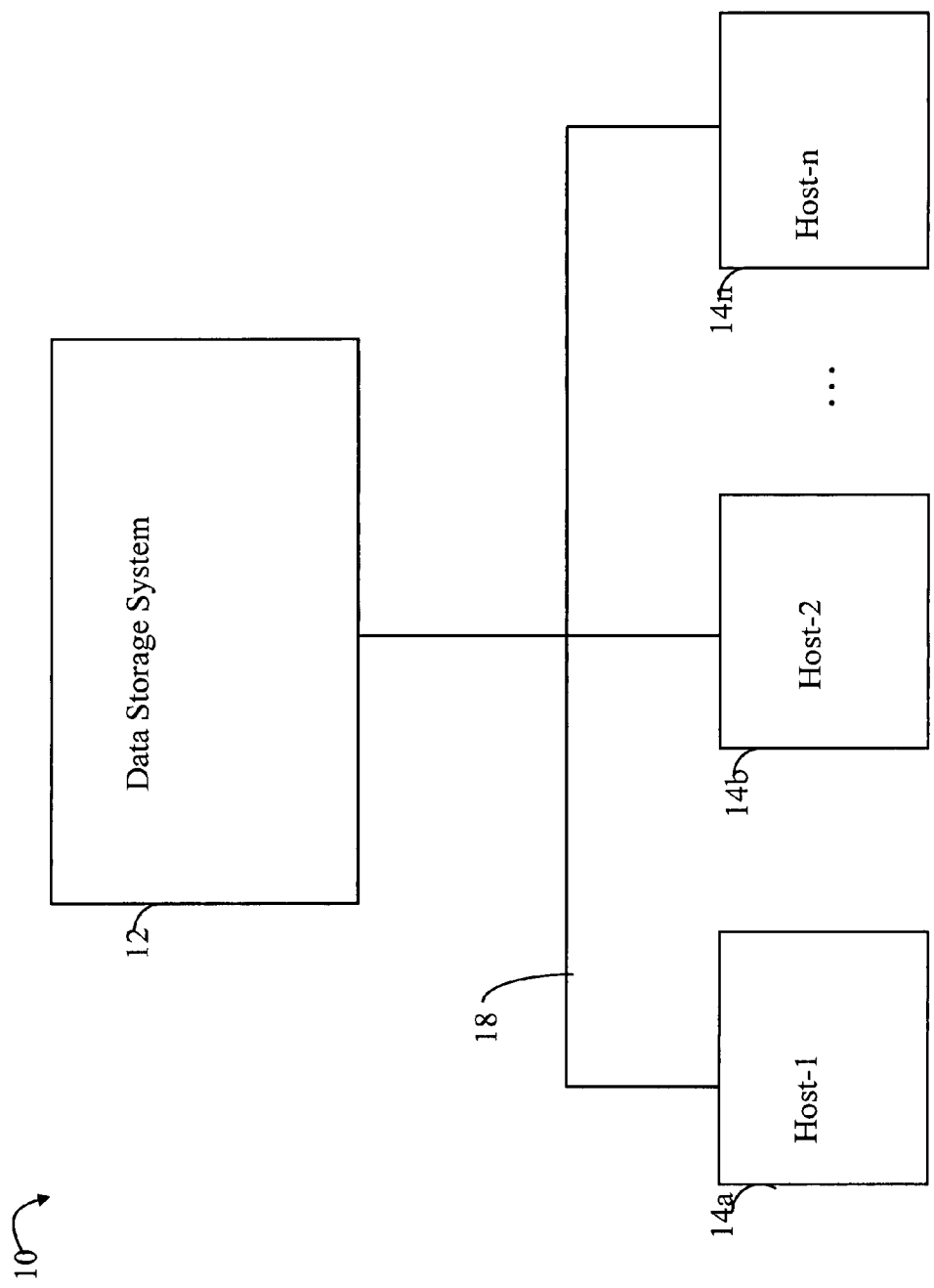
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
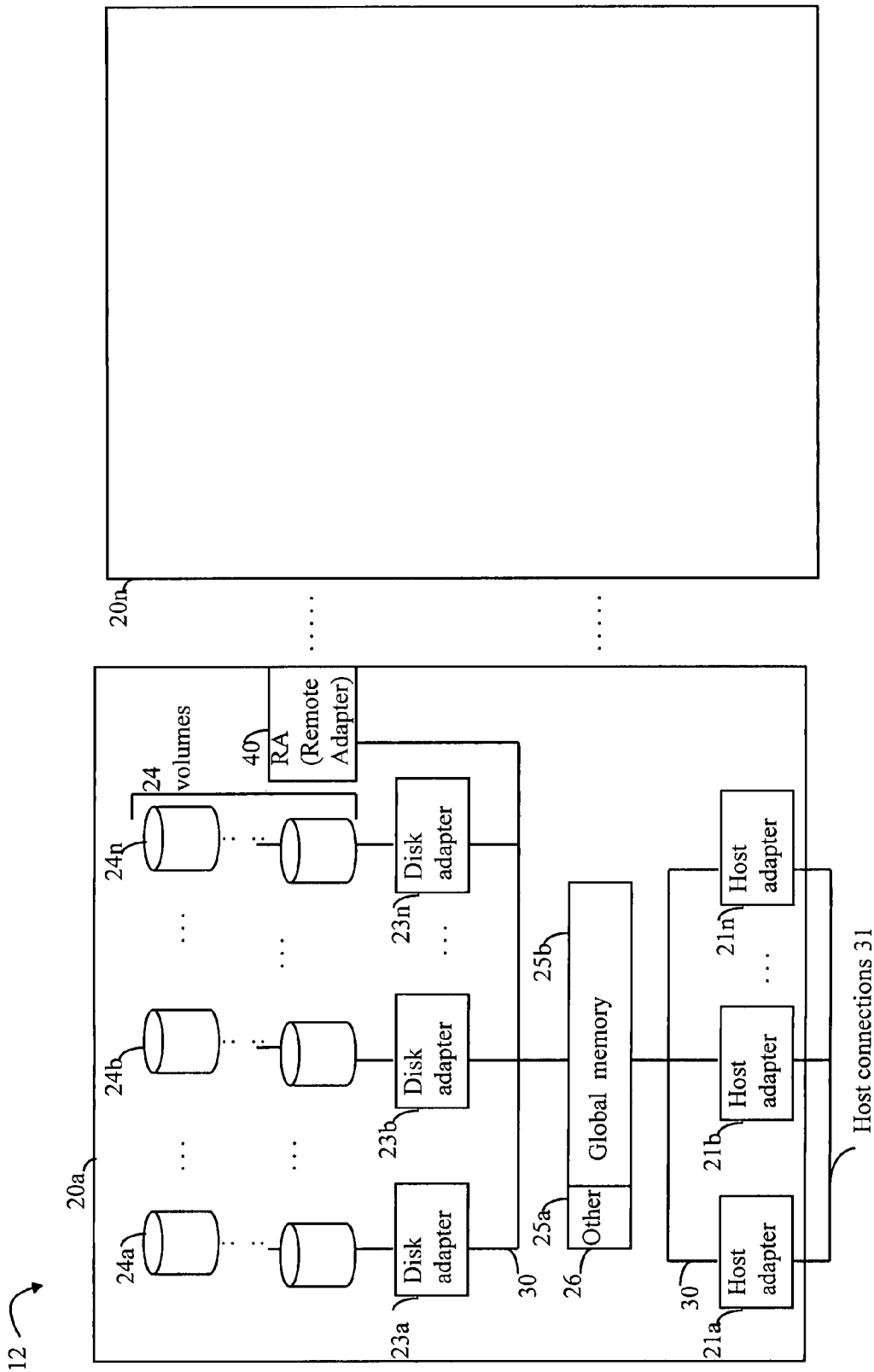
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
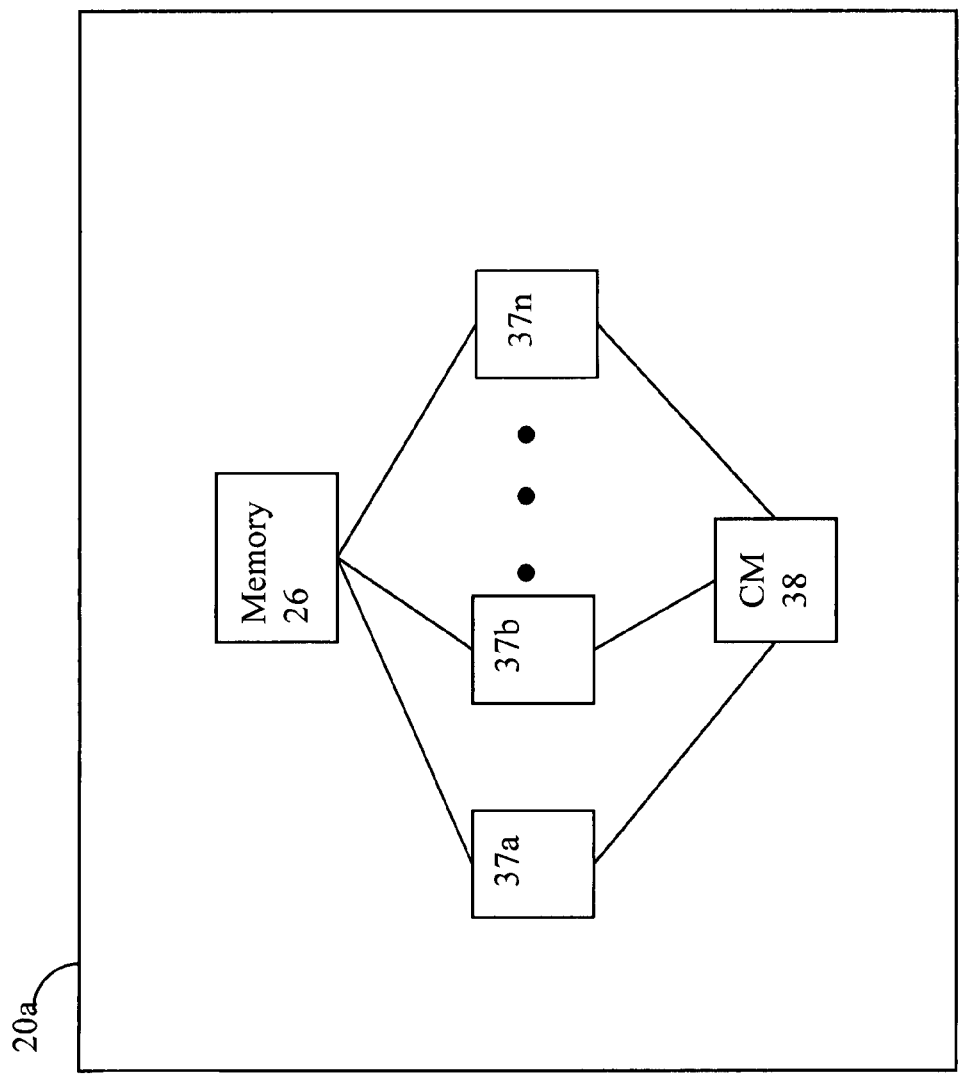
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
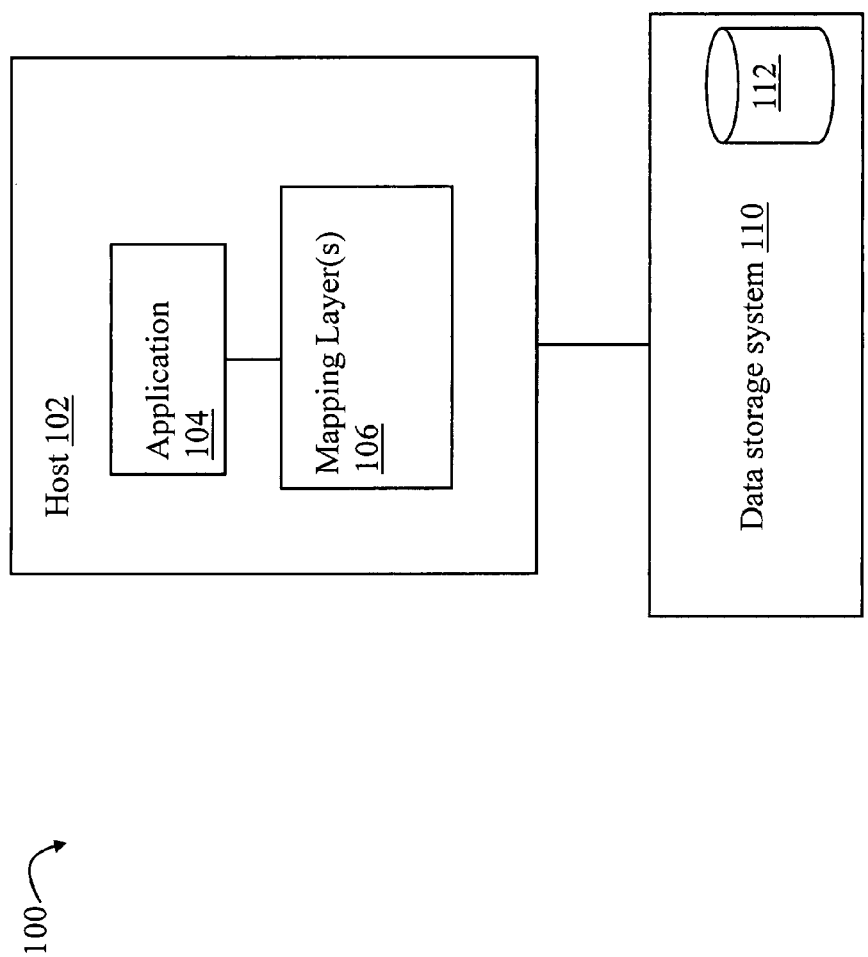
FIG. 3 is an example of an embodiment of a host and data storage system that may utilize the techniques described herein.

Referring to FIG. 3, shown is an example representation of a host and data storage system that may be used in connection with the techniques herein. The host 102 may include one or more applications 104 and one or more mapping layers 106. As described in following paragraphs, the mapping layers 106 may be used to facilitate data storage requests for data included in data storage system 110 by the application 104.

Data stored on storage devices of the data storage system 110 may be organized into units referred to as blocks of the physical device 112. Each block has an associated size, such as 512 bytes. Data requests and operations on the host-side may use logical data objects including groups of related blocks which may or may not be contiguous. Logical data objects on the host may be used by one or more applications 104 as well as the one or more mapping layers 106.

Files are examples of logical data objects on the host-side which refer to collections of data storage blocks. For example, an application 104 may perform I/O operations on a file. File systems and logical volumes (LVs) are other examples of logical data objects on the host-side which refer to collections of data storage blocks on physical devices of the data storage system. For example, a system manager may perform operations related to a file system including one or more files. Different logical data objects may be used by the application as well as one or more of the mapping layers 106. For example, as will be described in following paragraphs, the mapping layers 106 may include a Logical Volume Manager (LVM) which uses LVs. The mapping layers 106 may be used to map storage locations associated with a first higher level logical data object, such as the file, to corresponding storage locations expressed using other logical data objects, such as LVs, as may be used by the different mapping layers 106.

Figure 4:
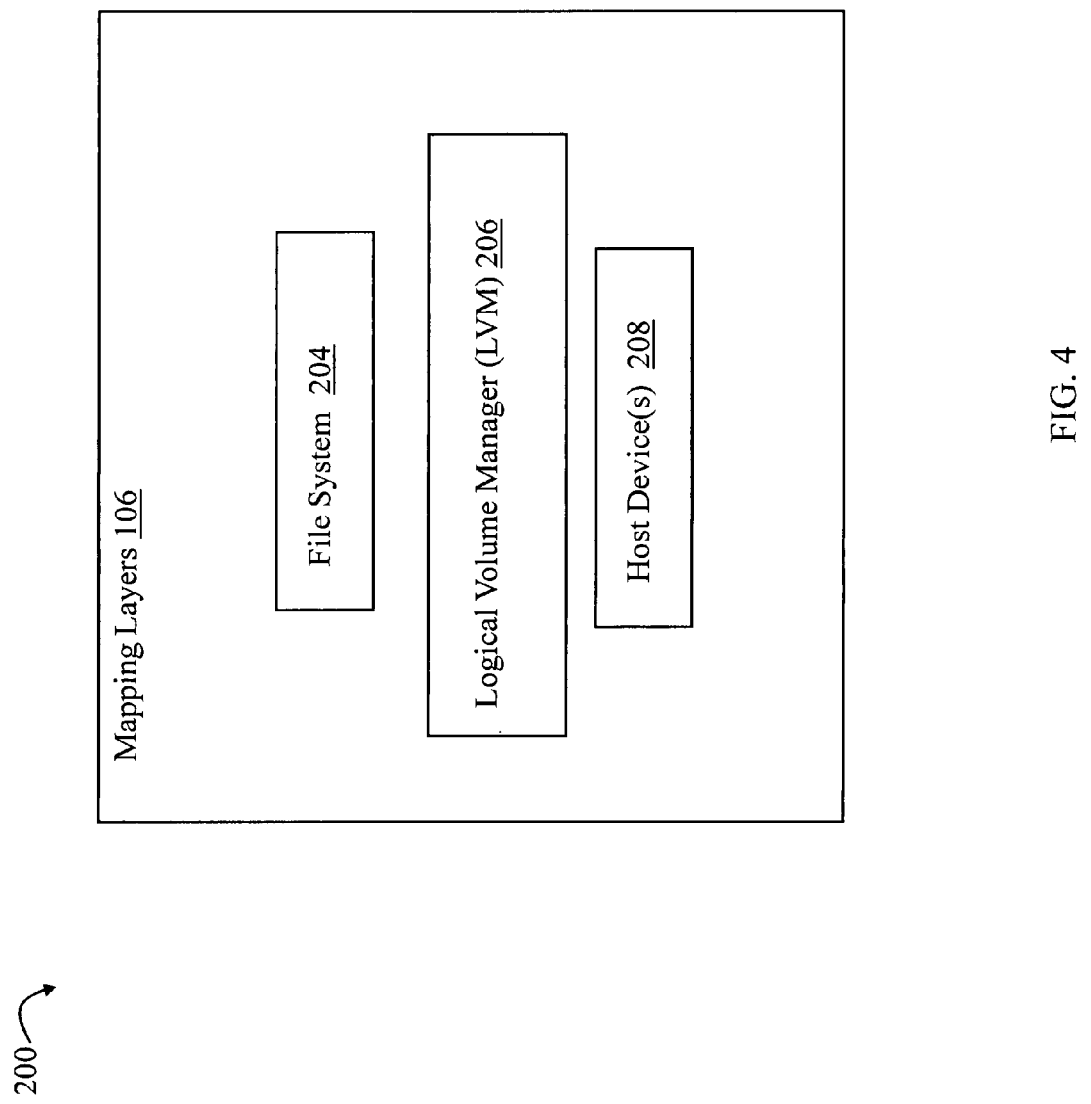
FIG. 4 is an example of the mapping layers that may be included in a host.

Referring to FIG. 4, shown is an example illustrating the different mapping layers that may be included in an embodiment. The mapping layers 106 in the example 200 include a file system 204, LVM 206 and host device layer 208. Although 3 layers are illustrated, it should be noted that an embodiment may include any number of layers for use with the techniques herein. The layers form a stack with the highest layer or level in this example being the file system 204, and the lowest mapping layer or level being the host device layer 208. Each layer performs a mapping of a data storage location having a first logical representation to a second logical representation at the next lowest level. Each layer may use different logical data objects to express a data storage location. Furthermore, as described above, an embodiment may have one or more different logical data objects used by the different mapping layers. For example, an application may perform a request to read or write data to a location in a file. The location as used by the application and file system 204 may be expressed as a first representation of a file and offset (e.g., block offset) within the file. The file system 204 maps the first representation to a second representation understood by the LVM 206. More specifically, the file and offset within the file are mapped to an LV and offset as understood by the LVM 206. The LVM 206 maps the second representation to a third representation understood by the host device layer 208. More specifically, the LV and offset are mapped to a host device and offset as understood by the host device layer 208. The representation at each layer may be characterized as a logical representation of a data storage location as used by the host. The logical representation of a data storage location of the bottom-most or lowest layer (e.g., 208 in this example) may then be mapped to a physical location on the data storage system 110, such as a location on the physical device 112 of FIG. 3.

With reference back to FIG. 3, the mapping layers 106 may be used to identify the physical locations (e.g., data storage system device and blocks thereon) included in the data storage system 110 which make up a logical data object as used by the host, such as a file, file system, LV, host device, and the like. In other words, given a host-side logical data object, the physical storage locations on a device of the data storage system are identified. The foregoing may be characterized as a forward mapping process as described, for example, in U.S. Pat. No. 6,542,909, Apr. 1, 2003, SYSTEM FOR DETERMINING MAPPING OF LOGICAL OBJECTS IN A COMPUTER SYSTEM, Tamer et al., assigned to EMC Corporation of Hopkinton, Mass., which is incorporated by reference herein.

In connection with data storage systems, it may be desirable to perform a mapping process which can be characterized as the reverse of the foregoing. In such a mapping process, one or more storage locations may be specified in terms understood by the data storage system for which one or more corresponding host-side logical data objects are determined. As an example, a storage location may be specified using a particular data storage system identifier, a physical device on the data storage system, and block number on the physical device. Using techniques that are described herein for reverse mapping, one or more corresponding host-side logical data objects (e.g., file, file system, LV, and/or host device) including that storage location may then be determined.

The foregoing reverse mapping process of determining the host-side logical data objects given one or more data storage system storage locations has a variety of different uses. For example, a block on a physical device of the data storage system may be identified as a "bad block" including corrupted data. The techniques herein may be used to determine the particular file system including the bad block. Furthermore, the techniques herein may be used to determine the particular type of data—user data, metadata or free space—associated with the file system that includes the bad block. As known in the art, a file system may include different types of data such as user data (e.g., user data included in the file), metadata, and free space. Metadata may be defined as data about data. In connection with file systems, metadata may include data describing the files of the file system. Metadata about a file system may include, for example, a list of all files in the file system. Metadata about one of the files may include, for example, the file name, current file size, creation and/or modification date, and the like. The user data is included in a file. Free space includes blocks of free space which may be allocated by the file system for use in connection with performing operations. If the bad block is included in user data, the particular file including the block may be identified.

Information regarding the logical data object(s) including the bad block may be used to take further action. For example, if the bad block is included in a file, a restoration of the file from a previously saved and valid copy of the file data may be performed rather than restoring a larger amount of data, such as an entire file system including the bad block. If the bad block is included in free space, the bad block may be marked so that it is not allocated. If the bad block is included in metadata, the file system including the bad block may be restored from a previously saved and valid set of data.

The foregoing is just one use of the techniques described herein in following paragraphs along with additional exemplary uses.

Figure 5A:
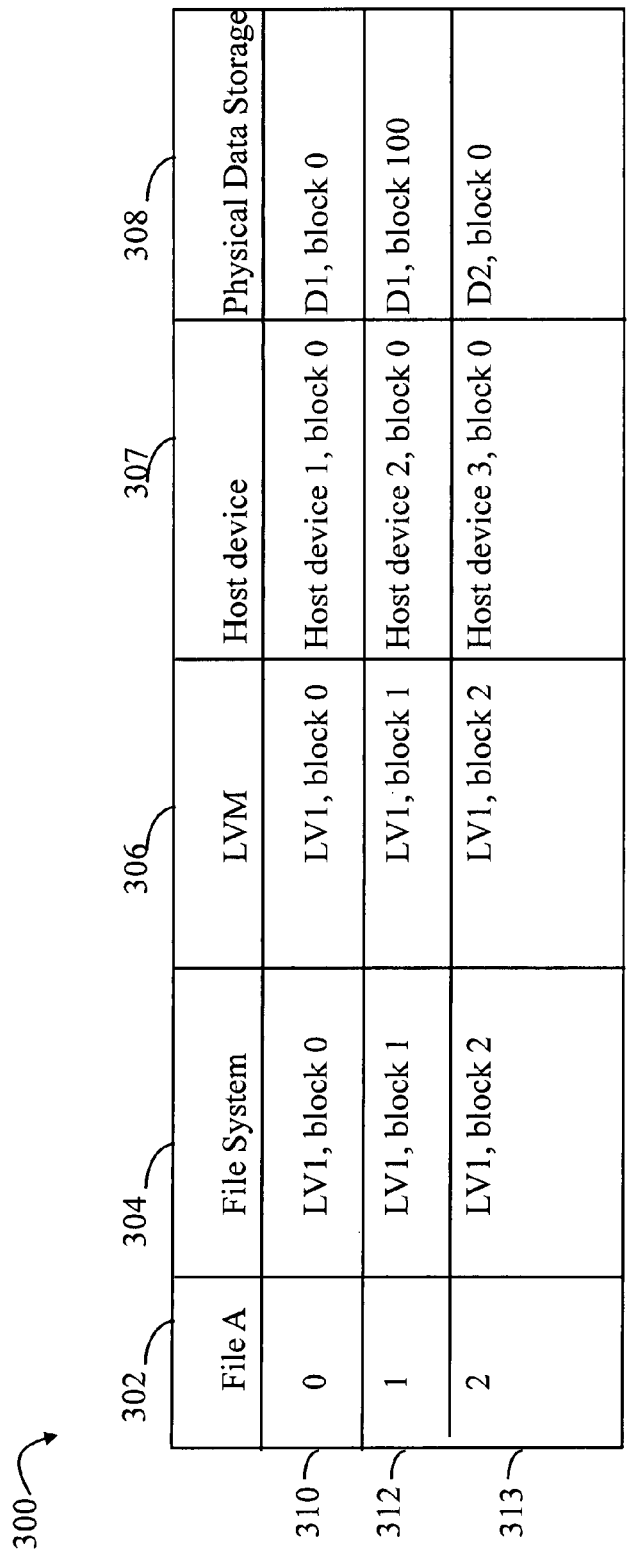
FIGS. 5A and 5B illustrate host-side logical representations for corresponding physical data storage locations of a file.

Referring to FIG. 5A, shown is an illustration of the different logical data entities and storage location representations. The example 300 illustrates the different representations of the storage locations of file A as used by the host (columns 302, 304, 306 and 307) and data storage system (column 308). File A has data blocks as indicated in column 302. For simplification of illustration, file A has 3 blocks—0, 1, and 2, each having a corresponding row in the table, respectively, 310, 312, and 313. Columns 304, 306, and 307 indicate logical representations of the storage locations for file A, respectively, by the file system, LVM, and host device mapping layers. Column 308 indicates the location on a physical device of the data storage system. As illustrated by row 310, block 0 of file A has a corresponding first logical representation as used by the file system at LV1, block 0, a second logical representation as used by the LVM at LV1, block 0, and a third logical representation as used by the host device layer at host device 1, block 0. Block 0 of file A has a corresponding physical device location on the data storage system at device D1, block 0.

Figure 5B:
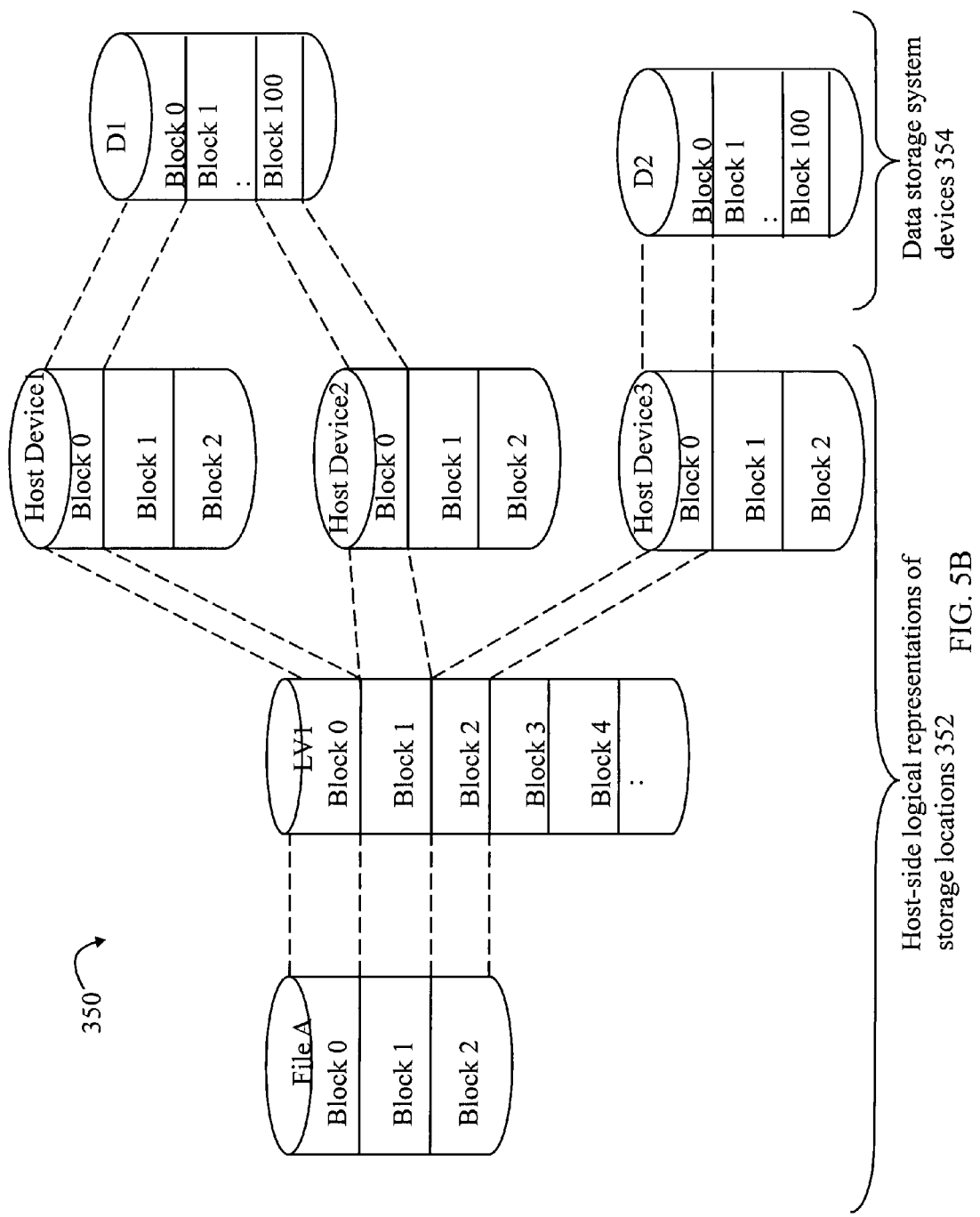

Referring to FIG. 5B, shown is a graphical illustration of the mapping between physical locations on the data storage system and corresponding host-side logical representations for the storage locations. The example 350 graphically illustrates the information included in the table 300 of FIG. 5A. The example 350 includes the host-side logical representations of storage locations 352 as used by the different mapping layers, and the corresponding physical storage locations 354 of the physical devices in the data storage system.

In connection with the techniques herein, a bad block may be located at block 0 of the data storage system device D1 as illustrated by the row 310. By mapping the physical data storage system location in 308 up the mapping layer stack used by the host from the lowest level representation, the corresponding logical representations of storage locations as used by the host for the physical storage location may be determined for each layer. From the corresponding logical representations of the host, logical data objects, such as the host device or LV, including the bad block may be determined. Furthermore, from the logical representations of storage locations as expressed using the logical data objects (e.g., LVs, host devices), higher level logical data objects, such as the file and file system, including the bad block may be determined. The particular type of file system data (e.g., user data, metadata, free space) may be determined using metadata. If the block is in user data, the file including the block may also be determined using metadata.

In the example illustrated by the table of FIG. 5A, the file system is mounted on an LV of the LVM. As an alternative in an embodiment not utilizing an LVM, the host may not include an LVM mapping layer and the file system may be mounted on a host device as used by the host device layer. In this latter instance with reference to FIG. 5A, column 306 may be omitted, and the data included in column 304 would then match the data included in column 307.

With reference to FIG. 5A, exemplary logical data objects used by the host include an LV (e.g., LV1) and host device (e.g., host devices 1, 2, and 3). Higher level logical data objects, such as the file A and the file system including file A, may be described using one or more lower level logical data objects, or portions thereof.

Figure 6A:
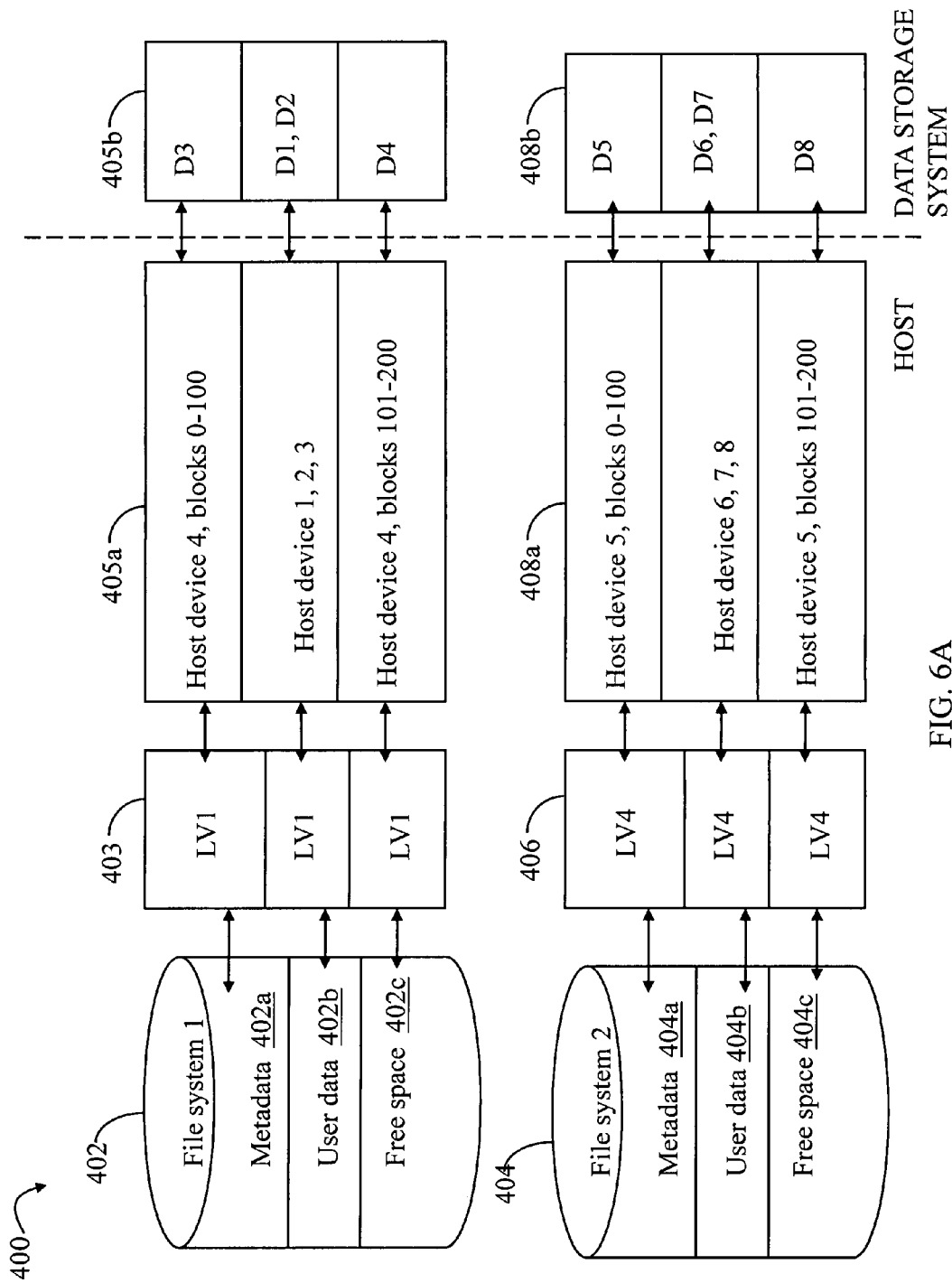
FIG. 6A illustrates the different mappings that may be performed in connection with host-side logical representation and corresponding physical data storage locations associated with a file system.

Referring to FIG. 6A, shown is an example representation of the different types of data that may be included in a file system. A host may include one or more file systems. In the example 400, a host may include a first file system 402 having metadata portion 402a, user data portion 402b, and free space portion 402c. The host may include a second file system 404 having metadata portion 404a, user data portion 404b, and free space portion 404c. The file system 402 may be configured to have each of the different types of data for 402a-c as represented in 403 and 405a on the host side with physical data storage devices as indicated by 405b. The file system 404 may be configured to have each of the different types of data for 404a-c as represented in 406 and 408a on the host side with physical data storage devices as indicated by 408b.

With reference to file A as illustrated in FIGS. 5A and 5B, file A may be included in file system 1 402. The user data of file A is included in user data portion 402a. The metadata for the file A is included in metadata portion 402b. User data of file system 402 is configured to reside on LV1, host devices 1, 2 and 3, or portions thereof, and data storage system devices D1 and D2. Similarly, the metadata portion 402a and free space portion 402c reside at other locations on LVs and host devices. For example, portion 402a may reside in LV1 and host device 4, blocks 0-100 on the host-side and device D3 of the data storage system. Portion 402c may reside in LV1 and host device 4, blocks 101-200 on the host-side and device D4 of the data storage system. Given a physical data storage location, the particular LV or host device including the physical data storage location may be determined. Furthermore, based on the particular LV or host device and location thereon, a determination may be made as to which file system includes the physical data storage location and whether the physical data storage location resides in metadata, user data or free space of the file system.

Each of the different mapping layers may include information necessary to map a logical representation of a storage location to a next lowest level. Such information may also be used in connection with the techniques herein to perform a reverse mapping and determine the host logical data objects for a corresponding physical data storage location on a data storage system device.

Figure 6B:
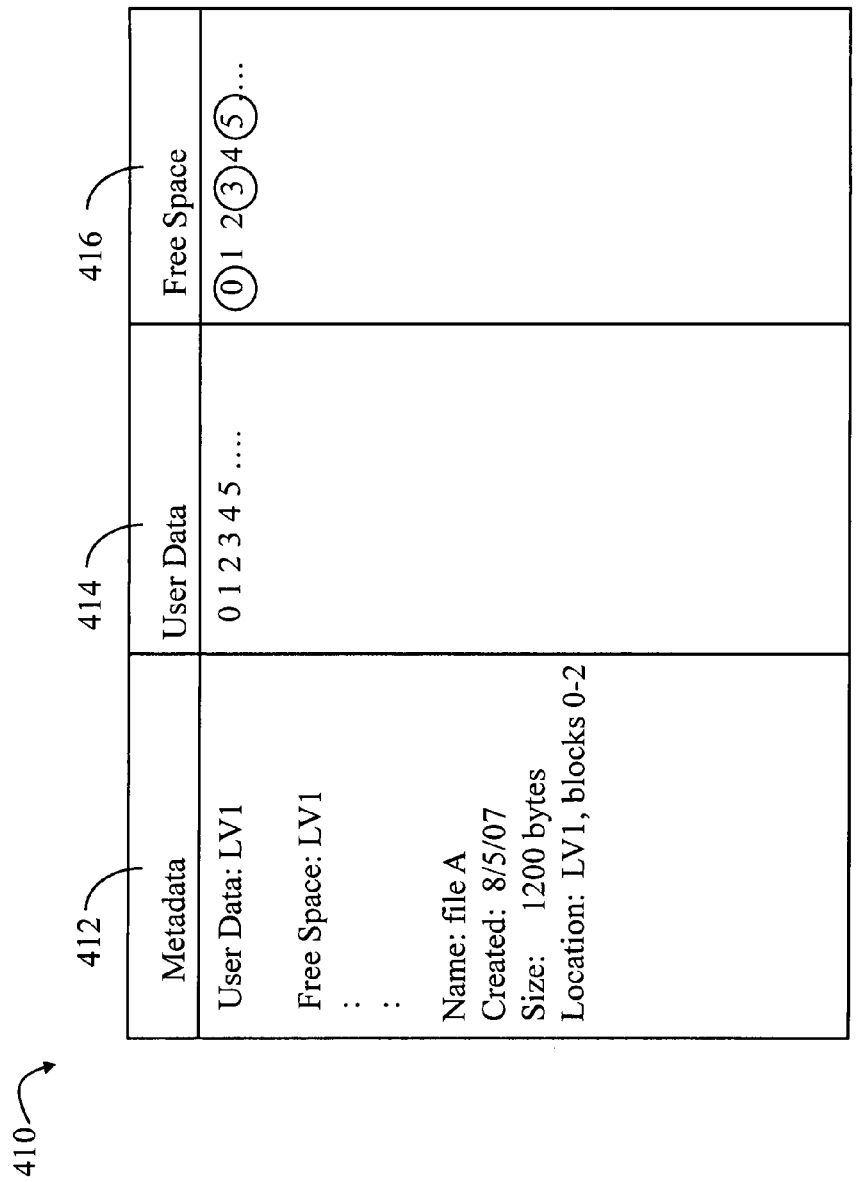
FIG. 6B is an example illustrating metadata, user data and free space as may be included in a file system of FIG. 6A.

Referring to FIG. 6B, shown is a representation of data as may be associated with a file system and the different types of data. The example 410 includes metadata 412, user data 414 and free space 416 as may be included in a file system, such as file system 402 of FIG. 6A. The user data portion 414 may include data for various files such as file A. The metadata portion 412 may include metadata for the file system as well as each file in the file system. Metadata for the file system may include a list of all files in the file system, the locations associated with storage allocated for the file system and each file, and the like. For example, the metadata 412 may indicate which LV is used for storing the user data and free space of the file system mounted on an LV. Such information is represented by elements 403 and 406 of FIG. 6A. With reference to file A, the metadata portion 412 may include metadata information for the file including the name of the file, when the file was created, the size of the file and the location of the file expressed in terms of the logical representation of the location in the file system. Such information regarding file A is represented in column 304 and 306 of FIG. 5A and graphically represented in FIG. 5B.

As described elsewhere herein, the user data 414 may include the user data for the one or more files of the file system, and the free space 416 may include blocks of storage for use by the file system. In the example 410, those blocks of the free space pool which are unused are indicated with a circle around a number representing a block number in the free space portion 416.

Figure 7:
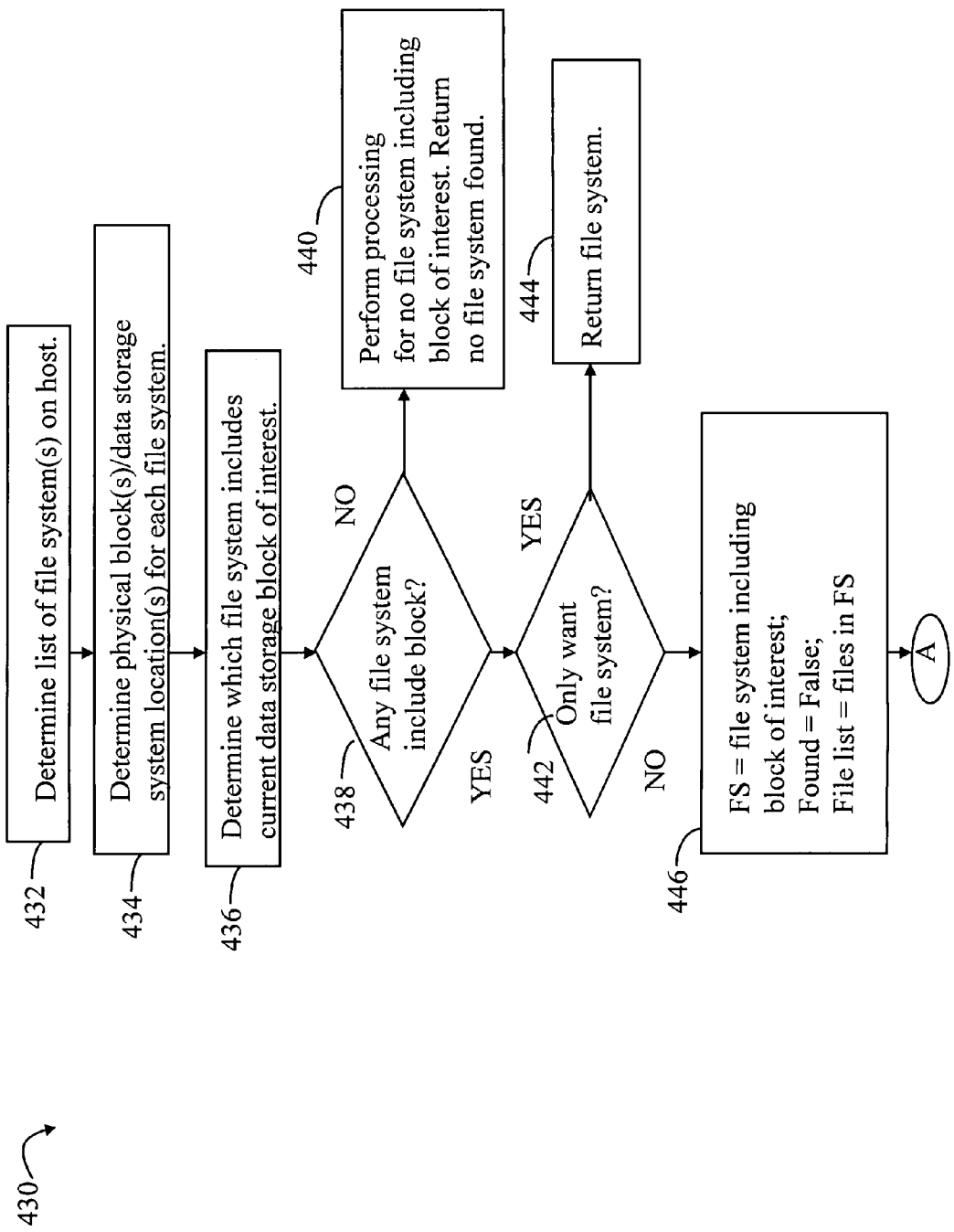
FIGS. 7-8 are flowcharts of processing steps of a first technique for performing reverse mapping to determine one or more host-side logical data objects given a physical device location on a data storage system.
Figure 8:
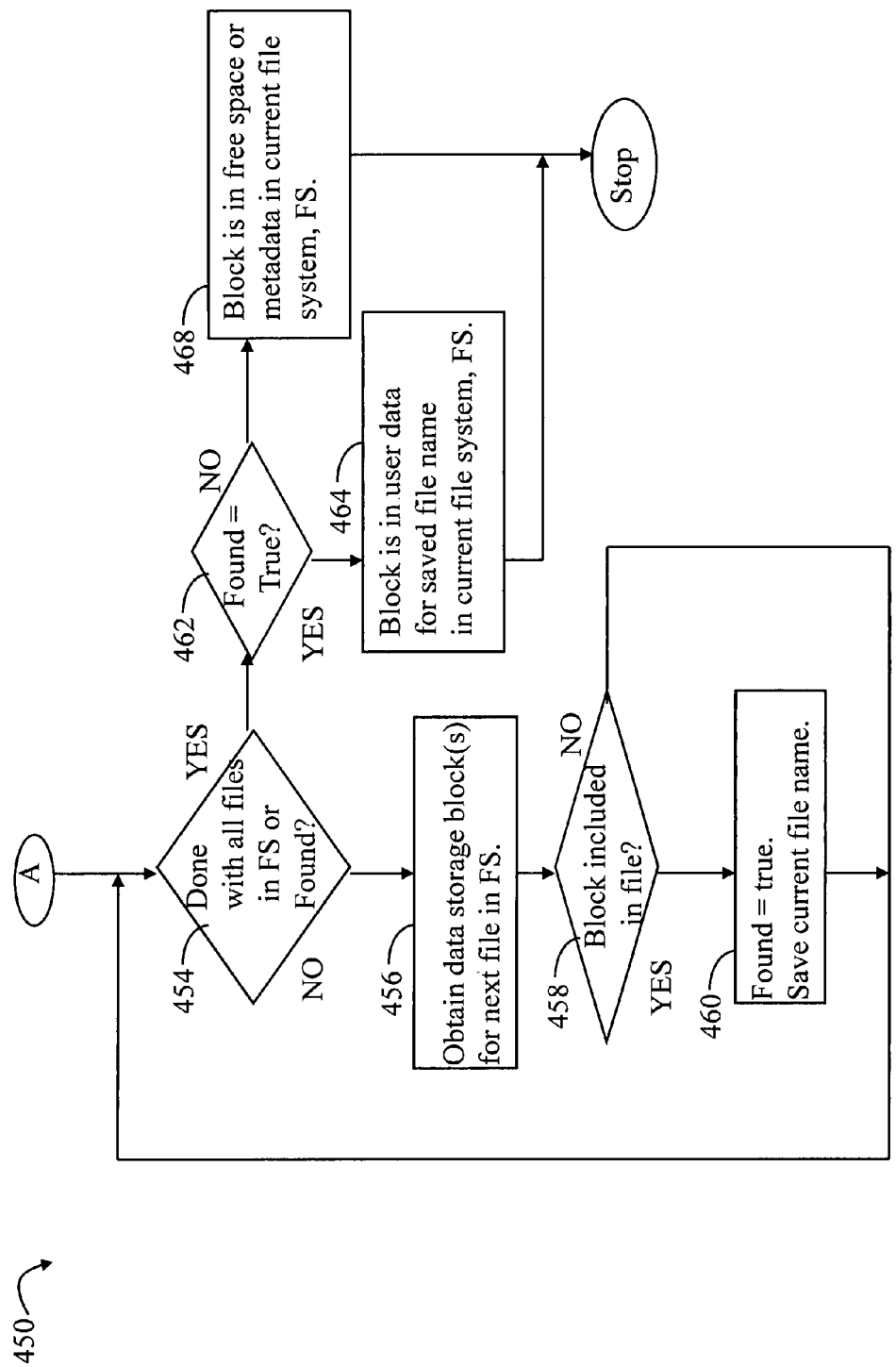

Referring to FIGS. 7 and 8, shown are flowcharts of processing steps that may be performed in an embodiment for reverse mapping. Given as an input a physical location on a device of the data storage system, the processing steps use a forward mapping technique to determine the file system and file including the physical location. It should be noted that although the processing steps of FIGS. 7 and 8 determine particular logical data objects of the file system and file, the techniques described herein may be used to perform a reverse mapping for determining other host-side logical data objects, such as LVs, host devices, and the like, for a particular physical storage location on a device of the data storage system. Furthermore, it will be appreciated by those skilled in the art that there are other ways of performing the reverse mapping in addition to the particular technique of using forward mapping operations and processing steps of FIGS. 7 and 8.

As an input to the processing of flowchart 430, a physical location on a device of a data storage system, a current data storage block of interest, is provided. In one embodiment, this physical location may be represented by specifying a data storage system, device on the data storage system, and location (e.g., a block) on the device. At step 432, a list of the file systems on the host is determined. The particular file system on a host may be determined by examining the appropriate configuration information for the host and may vary with operating system and other particulars of an embodiment. For example, a Windows NT operating system supports multiple file systems including the File Allocation Table (FAT) file system, the NT file system (NTFS), and the high performance file system (HPFS). At step 434, the physical blocks on the data storage system associated with each file system are determined. With reference to FIG. 6A, the physical locations on devices of the data storage system as configured for each file system may be determined by performing forward mapping using data, such as metadata, regarding each file system to determine the information represented by 405b and 408b, respectively, for file systems 402 and 404. At step 436, the range of physical data storage system blocks for each file system are examined to determine which file system, if any includes the current data storage block of interest as input to the flowchart 430 processing. At step 438, a determination is made as to whether the current data storage block of interest is included in any of the file systems. If not, control proceeds to step 440 where appropriate processing is performed for no file system including the block of interest. For example, a message may be output indicating that no file system was determined. If step 438 evaluates to yes, control proceeds to step 442 where a determination is made as to whether only the file system is to be determined. In one embodiment, the file system alone, or the file system in combination with additional logical data objects and/or other information may be determined. If step 442 evaluates to yes, control proceeds to step 444 where the file system determined at step 436 is returned. If step 442 evaluates to yes, additional processing is performed to determine which file, if any, includes the current data storage block of interest. At step 446, some initialization is performed. FS refers to the file system determined at step 436 as including the current data storage block of interest. Found is initialized to false. File list is initialized as a list of all the files in FS as may be determined using the metadata for the file system FS.

In connection with processing performed by the loop beginning at step 454, each file included in the file system FS is examined. The physical data storage system locations associated with each file are obtained and a determination is made as to whether the current data storage block of interest is included in the physical data storage system locations for the file. Processing of the loop stops when either all files in the FS have been examined and none found to include the current data storage block of interest, or the file including the current data storage block of interest has been located. If the first foregoing condition (e.g., all files in FS have been examined) causes termination of the loop at step 454, the current data storage block of interest is not included in user data and, therefore, is included in either free space or metadata for the file system determined at step 436.

At step 454, a determination is made as whether all files in FS have been processed, or whether a file including the current data storage block of interest has been found. If step 454 evaluates to no, control proceeds to step 458 where the physical data storage system locations for the next file in the list of files for FS are obtained. A determination is made at step 458 as to whether the current data storage block of interest is included in the current file having physical locations obtained at step 456. If so, control proceeds to step 460 where found is assigned true to indicate that the file including the current data storage block of interest has been located and the file name may be saved for later processing, such as to be output to a user. Control then proceeds from step 460 to step 454. If step 458 evaluates to no, control proceeds directly to step 454.

If step 454 evaluates to yes, control proceeds to step 462 where a determination is made as to whether a file including the current data storage block of interest has been located. If step 462 evaluates to yes, control proceeds to step 464 where it is determined that the current data storage block of interest is included in user data portion of the file system FS in the located file. Processing may be performed as part of step 464, for example, to output the file and file system determined from previous processing steps. If step 462 evaluates to no, control proceeds to step 468 where a determination is made that the current data storage block of interest is located in either free space or metadata for the current file system FS. Appropriate processing may be performed to output a message indicating the foregoing.

In one implementation of the processing of FIGS. 7 and 8, an API (application programming interface) may be defined which takes as an input one or more physical storage locations on a data storage system and returns as an output one or more host-side logical data objects containing the one or more physical storage locations provided as the API input. The one or more storage locations may be identified by specifying a data storage system, device on the data storage system, and one or more locations, such as blocks, of the device. The API may include one or more input parameters used to specify the particular host-side logical data object(s) to be identified. For example, with reference to FIGS. 7 and 8, the API may include a parameter specifying whether processing is performed to determine the file system, or file system and additional logical objects (e.g., file), and other information (e.g., location or offset in the file, file attributes, and the like). As part of processing to determine whether the one or more physical storage locations specified as input parameters are included in a file, the particular type of file system data (e.g., user data, metadata, free space) may be determined. With an API implementing the processing logic of FIGS. 7 and 8, a determination is made as to whether or not the physical storage location of the input parameter is in user data. For locations determined not to be included in user data, an embodiment can also perform additional processing to determine whether the physical storage location is in metadata or free space of the file system. It should be noted that an implementation of the API may also return other types of host-side logical data object(s) for one or more physical storage locations on a data storage system as described herein. For example, the API may identify the particular LV, host device, and the like, as may vary with each embodiment of the API and host.

One embodiment of FIGS. 7 and 8 may use an existing library of routines residing on the host. For example, the library may include a different routine for performing each of steps 432, 434, and 456. In such an embodiment, the runtime call stack includes a separate call at step 456 for each file in the file system and may introduce a large overhead in terms of processing time prior to completing processing for a large number of files in the file system.

Figure 9:
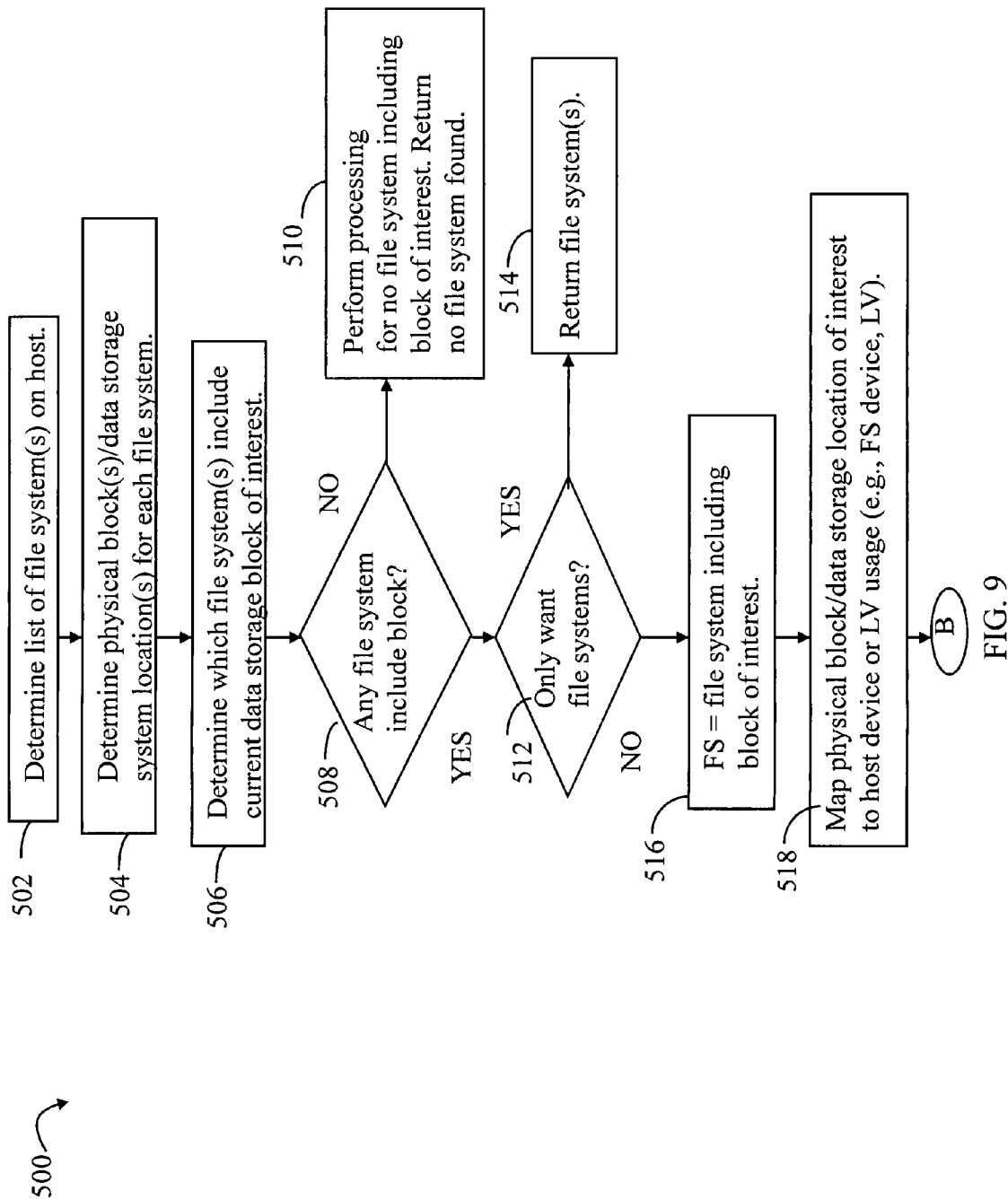
FIGS. 9-10 are flowcharts of processing steps of a second technique for performing reverse mapping to determine one or more host-side logical data objects given a physical device location on a data storage system.
Figure 10:
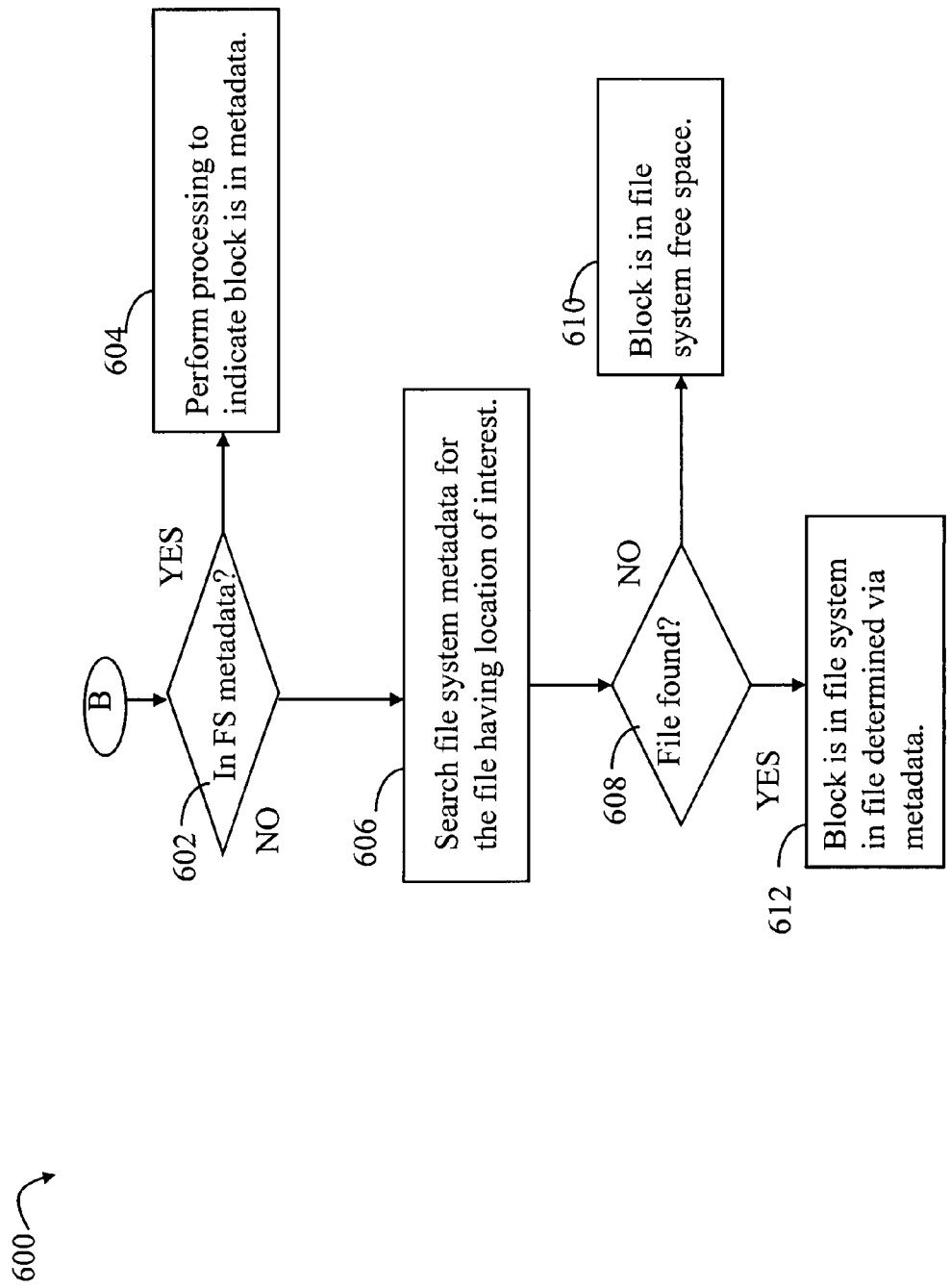

Referring to FIGS. 9 and 10, shown are flowcharts of processing steps of a second technique that may be performed in an embodiment for reverse mapping. The processing steps of FIGS. 9 and 10 may be performed as an alternative to using the technique of FIGS. 7 and 8 in an embodiment. Steps 502, 504, 506, 508, 510, 512, and 514 are respectively analogous to steps 432, 434, 436, 438, 440, 442 and 444 of FIG. 7. At step 516, FS is assigned the file system determined at step 506. At step 518, the physical data storage system location specified as an input parameter is mapped to a corresponding host-side logical representation. For example, the data storage system device and block number are mapped to the corresponding LV and block number or host device and block number. For purposes of illustration in an embodiment including a file system and LVM, the LV and block number may be determined at step 518. Control proceeds to step 602 where a determination is made as to whether the LV and block number determined at step 518 are located in the metadata portion of FS. As described elsewhere herein, processing of steps 602 and 606 may be performed using metadata of the FS. If step 604 evaluates to yes, control proceeds to step 604 to perform processing in accordance with a determination that the physical data storage system location input to processing is located in metadata of the file system FS. If step 602 evaluates to no, control proceeds to step 606 where the file system metadata is searched to determine if the LV and block number from step 518 are included in any file. As described elsewhere herein, the metadata for each file may specify the LV and block(s) associated with each file in the file system. The particular structure and organization of the metadata may vary with embodiment. At step 608, a determination is made as to whether a file has been located in FS which includes the LV and block determined at step 518. If not, control proceeds to step 610 where a determination is made that the block is in free space of the file system FS. If step 608 evaluates to yes, control proceeds to step 612 where a determination is made that the block is in the file system FS in the file determined in step 606.

It should be noted that a different host-side logical representation for the physical data storage location of interest may be determined in step 518 depending on the mapping layers included in an embodiment. For example, in an embodiment which includes the file system and host device layers, step 518 may determine a host device and block number or location on the host device.

As described above, in connection with FIGS. 7 and 8, an API may be implemented using the technique of FIGS. 9 and 10. One embodiment of FIGS. 9 and 10 may use an existing library of routines residing on the host. For example, the library may include a different routine for performing each of steps 502, 504, and 518. Subsequent processing steps may be performed within the API by direct examination of the metadata for the file system determined at step 506.

FIGS. 7 and 8 perform processing for each file (e.g., step 456) by determining the corresponding physical data storage locations for the file and comparing these physical data storage locations to the current physical data storage location of interest. In contrast, FIGS. 9 and 10 may process each file (e.g., step 606) by performing comparisons using host-side logical representations corresponding to the current physical data storage location of interest.

An embodiment may implement both the techniques of FIGS. 7 and 8 and FIGS. 9 and 10 using a single API with an additional input parameter indicating which technique to use for a particular invocation. It will be appreciated by those skilled in the art that an embodiment of the API implementing one or more of the techniques herein may also output additional data attributes associated with a host-side logical data object included as an output or return value. For example, other file and/or file system attributes may be returned. In one embodiment, code executed in connection with the techniques herein may be stored on a computer-readable medium on the host. Different types of computer-readable medium are well known in the art and may include, for example, different types of non-volatile storage, such as disks, as well as volatile storage devices. As also known in the art, the host may determine the one or more data storage systems and devices which can be accessed by the host by performing discovery processing prior to performing the techniques described herein.

The techniques herein have a wide variety of applications and uses. As described above, the techniques herein may be used to identify the host-side logical data objects, such as a file and file system, including a physical data storage system location. Such information may be used to take an appropriate action in response to the detected bad block determined to include corrupted data. Other exemplary uses of the techniques herein will now be described.

A physical device on the data storage system can be configured as two LVs and may include multiple host devices. Each LV and host device may have stored thereon a different file system so that multiple different file systems reside on the same drive or physical data storage system device. The storage administrator may want to know which file system(s) or file(s) use a given portion of the data storage system device. Such a determination may be made using the techniques herein.

As another example use, a data storage administrator may observe that a particular device, or portion of the device, of the data storage system has a large amount of I/O operations. The administrator may use the techniques herein to determine what file system(s) and/or file(s) are stored on the device. For example, if it is determined that 2 particular files or two file systems are located on the foregoing active data storage system device, the administrator may reconfigure the data storage system so that each file or file system is located on a different physical device of the data storage system to increase performance/decrease response time and I/O processing time.

The techniques herein may be used in connection with auditing a portion of a physical data storage system device. For example, a data storage system may record when blocks of user data or metadata associated with read-only data sets are modified. The data storage system may have a bitmap and associate one bit with each block of the portion being monitored to record any modification. Each time a block is changed in the metadata and/or user data portion being monitored, the block's corresponding bit is turned on. The bitmap may be checked at various points in time and the techniques herein may be used to determine, for each modified block, if the block that is modified is in user data, metadata or free space. If the block that has been modified is included in user data, the host may determine that a data modification has occurred to the read-only data and perform appropriate processing for the data compromised.

The techniques herein may also be used to more generally monitor other portions of data on a data storage system besides read-only data. For example, a data storage system may be configured to monitor those data portions associated with a critical data file, a file which is not typically modified, and the like. Modification to such data may indicate a security problem such as a virus compromising system data.

The foregoing are some exemplary uses of the techniques herein. It will be appreciated by those skilled in the art that the techniques herein may be used in connection with other applications and uses besides those set forth above.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining one or more logical data objects for a storage location comprising:
providing the storage location indicating a location on a device of a data storage system;
receiving a list of one or more logical data objects;
determining, for each of the one or more logical data objects, one or more related data storage system locations associated with said each logical data object; and
determining whether the storage location is included in any of the one or more logical data objects, wherein said determining whether the storage location is included in any of the one or more logical data objects includes identifying whether, for each of the one or more logical data objects, the storage location is one of the one or more related data storage system locations associated with said each logical data object.

2. The method of claim 1, wherein the one or more logical data objects are used by a host connected to the data storage system when performing I/O operations.

3. The method of claim 2, wherein one of the logical data objects is a file system of the host.

4. The method of claim 3, wherein one of the logical data objects is a file in the file system.

5. The method of claim 2, wherein one of the logical data objects is one of a logical volume or a host device.

6. The method of claim 1, wherein the storage location is specified using a first identifier for the device, and a second identifier representing one or more blocks on the device.

7. The method of claim 6, wherein the storage location is specified using a third identifier for the data storage system.

8. The method of claim 1, wherein the storage location identifies a block on the device including corrupted data.

9. The method of claim 1, wherein the storage location identifies a block on the device being monitored to detect when the block has been modified.

10. A method for determining one or more logical data objects for a storage location comprising:
   providing the storage location indicating a location on a device of a data storage system;
   receiving a list of one or more file systems on a host, each of the one or more file systems being one of the logical data objects;
   determining, for each of the one or more file systems, one or more related data storage system locations associated with said each file system; and
   determining whether the storage location is included in any of the one or more file systems, wherein said determining whether the storage location is included in any of the one or more file systems includes identifying whether, for each of the one or more file systems, the storage location is one of the one or more related data storage system locations associated with said each file system.

11. The method of claim 10, further comprising:
   identifying a first file system of said one or more file systems including the storage location; and
   determining a list of one or more files included in the first file system.

12. The method of claim 11, further comprising:
   determining, for each of the one or more files in the list, one or more related data storage system locations associated with said each file.

13. The method of claim 12, further comprising:
   determining whether the storage location is included in any of the one or more files of the first file system, said determining identifying whether, for each of the one or more files of the first file system, the storage location is one of the one or more related data storage system locations associated with said each file.

14. The method of claim 13, wherein, if the storage location is not included in any of the files of the first file system, determining that the storage location is included in either metadata or free space of the first file system, and otherwise determining that the storage location is included in user data of the first file system.

15. The method of claim 10, further comprising:
   identifying a first file system of said one or more file systems including the storage location; and
   mapping the storage location to a logical representation of the storage location as used by the host.

16. The method of claim 15, further comprising:
   determining, using the logical representation of the storage location, whether the storage location is included in metadata of the first file system.

17. The method of claim 16, wherein if it is determined that the storage location is not included in the metadata of the first file system, the method further comprising:
   determining, using the logical representation of the storage location, whether the storage location is included in a file of the first file system, and wherein if the file is not included in a file of the first file system, the storage location is determined as being included in a free space portion of the first file system.

18. A system comprising:
   one or more data storage systems, each of the one or more data storage systems including one or more data storage devices;
   a host connected to the one or more data storage systems, the host including executable code stored on a computer readable medium for determining one or more logical data objects for a storage location on a device of one of the data storage systems, wherein said storage location is provided as an input and said one or more logical objects are provided as an output, the computer readable medium comprising executable code for:
      providing the storage location indicating a location on a data storage device of one of the data storage systems;
      providing at least one mapping layer on the host connected to the data storage system, said at least one mapping layer including information used by the host to map logical data objects to corresponding storage locations in the data storage systems; and
      using the information to determine whether any of the logical data objects includes the storage location.

19. The system of claim 18, wherein the computer readable medium of the host further comprises executable code for:
   receiving a list of the one or more logical data objects;
   determining, for each of the one or more logical data objects, one or more related data storage system locations associated with said each logical data object; and
   determining whether the storage location is included in any of the one or more logical data objects, wherein said determining whether the storage location is included in any of the one or more logical data objects includes identifying whether, for each of the one or more logical data objects, the storage location is one of the one or more related data storage system locations associated with said each logical data object.

20. The system of claim 19, wherein the one or more logical data objects include at least one of: a file system, a file, a logical volume, and a logical device.

* * * * *